United States Patent Office 3,346,726
Patented Oct. 10, 1967

3,346,726
APPARATUS TO OPTIMIZE INDUSTRIAL CONTROL BY MAXIMIZING TIME DERIVATIVE OF CONTROL PARAMETER
Roland Rouxel, Troinex, 2 Rue des Moulins, Geneva, Switzerland, and René Perret, 4 Square Michels, Grenoble, France
Filed Feb. 25, 1963, Ser. No. 260,479
Claims priority, application Switzerland, Feb. 26, 1962, 2,361/62
7 Claims. (Cl. 235—150.1)

This invention relates to the control of industrial installations and is concerned more particularly with regulating an industrial installation, in such a manner as to impart an optimum rate of operation thereto.

In all industrial processes, there exists an optimum rate of operation which may be represented by the maximum value of an operating criterion. Thus, the optimum operation of a furnace is characterized by the fact that the temperature is equal to the maximum temperature compatible with the applied rate of fuel feed. This maximum temperature may have values which vary in accordance with the calorific content of the fuel, in accordance with the calorific capacity of various parts which are introduced into the furnace, in accordance with heat losses, which are not always constant, and so on. The essential requirement for the working of an installation performing any process is that its operating criterion should be at a maximum. Moreover, the apparatus controlling such an installation must influence the quantities, called action quantities, which govern the process, so that the operating criterion is always at a maximum. This apparatus must therefore be capable of correcting the effect of essentially random disturbances which may cause the installation to deviate from its optimum operation at any instant.

In some processes, the optimum is defined by the minimum value of the operating criterion. For example, optimum operation may correspond to minimum losses. Since it is always possible to consider the symmetrical value of any quantity, that is to say the quantity of opposite sign to the latter, the case of optimum rate of operation defined by the minimum of an operating criterion can always be converted to the case of the optimum rate defined by the maximum of some other criterion. For this reason, it will be assumed in the following that the optimum rate of operation always corresponds to the maximum of an operating criterion.

The operating criterion, the choice of which depends upon the process envisaged and upon various other considerations, for example economic consideration, is itself a more or less complex mathematical function of a number of physical quantities and it may be represented by an hypersurface or by a set of plane curves each representing one section of the hyperspace. For static systems, the hypersurface is steady, not depending on time, and the optimum operation is defined by the set of values corresponding to the apex of this hypersurface. For dynamic systems, on the other hand, the hypersurface depends on time and is perpetually moving and/or deforming; the optimum operation is therefore a succession of values which follows the migration of the apex of the hypersurface. Thus, FIGURE 3 of the accompanying drawings illustrates by way of example the curve form of the temperature, chosen as an operating criterion in the aforesaid case of the operation of a furnace, as a function of the ratio of the rate of fuel supply and as a function of the rate of air supply to fuel supply in the fuel-air mixture and as a function of the rate of secondary air supply intended for ventilation, the latter rate being considered as a parameter. The curve 131 has a maximum $A_m'$ which corresponds to optimum operation at a given instant $t$ and for a given value of the rate of secondary air supply. However, the curve 131 may become at the end of a time T the curce $131_a$. At this instant, there will be a new optimum rate of operation defined by the maximum $B_m'$. This change may be relatively slow, but its existence shows that the regulating apparatus, if it is to be effective, must be able to follow this change automatically by adapting the "combustion-assisting agent supply rate/fuel supply rate" ratio at each instant in such a manner as to produce the maximum temperature corresponding to the applied fuel supply rate.

Figure 3:
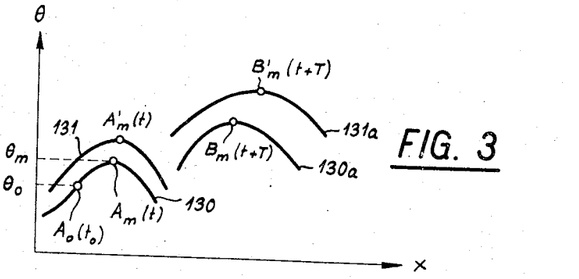
FIGURES 3 and 5 are graphs assisting in the understanding of the operation of that apparatus.

A distinction should be made between the static operating criterion, such as illustrated by the curves of FIGURE 3, just discussed, and the dynamic operating criterion. The latter is the instantaneous value of the static operating criterion while taking into account the time lags and time constants of the installation to be controlled. However, it is the static operating criterion which is to be maximized. In the absence of any variation of the physical quantities governing the process, or when these quantities vary only slowly, the dynamic operating criterion is equivalent to the static operating criterion and, in particular, their maximum values coincide. But when one of these physical quantities undergoes relatively rapid variation, the static operating criterion lags somewhat behind the dynamic operating criterion. In particular their time-derivatives do not go through zero at the same time and the zero of the time-derivative of the dynamic operating criterion does not correspond to the maximum value of the static operating criterion. Now, only the dynamic operating criterion can be measured when the physical quantities governing the process vary. The values of the physical quantities which maximize the static operating criterion must therefore be determined from the evolution of the dynamic operating criterion.

When it is possible to establish a mathematical model of the installation, its operation can be simulated in a computer, which is capable of supplying at any instant operating orders which produce the maximum value of the criterion.

When the installation does not lend itself to a sufficiently accurate mathematic formulation, and this is generally the case, it must itself be its own model, and various methods exist which operate in this way.

These methods consist in successively varying each of the action quantities to evaluate the effect of these variations on the value of the operating criterion. When the effect of these variations is known, the direction and amplitude of the corrections to be applied to these action quantities in order that the operating criterion may reach and remain at a maximum are determined. The disadvantage of these methods is related to the time constants inherent in all industrial installations, and it resides in the fact that it is necessary to wait a relatively long time, of the order of ten times these time constants, before being able to observe the effect on the operating criterion of the variation of the quantity under consideration. Such methods are therefore slow and consequently the variation observed in the operating criterion may be due to disturbances which have occurred during the time necessary for the observation. These methods are therefore subject to limitation in respect of the rapidity of disturbances the effects of which can be effectively corrected.

The object of the present invention is to reduce or remove the effect of these disadvantages and proposes a method of rapid regulation which is applicable to an installation the mathematical model of which is not known.

In accordance with the present invention there is provided an apparatus for controlling an industrial installation having at least one significant time constant, the performance of the installation depending on action quantities capable of being varied independently one after the other by corresponding actuators and the performance of the installation being defined by an operating criterion which is a function of at least one physical quantity continuously measured in the intallation by a corresponding one of at least one transducer, the apparatus to being and maintain dynamically the installation to optimum performance, defined by the operating criterion reaching a maximum value, and the apparatus comprising: a first member connected with said at least one transducer and arranged to generate from the signal delivered by said at least one transducer a first signal representative of the instantaneous value of said operating criterion; a second member connected with said first member and arranged to generate a second signal representative of the instantaneous value of the time-derivative of order $n$ of said first signal where $n$ is equal to the number of said significant time constants; a correcting member for generating a correction signal representative of the rate of variation of said action quantity; a switching member arranged for reversing the sign of said correction signal at a switching instant defined by a switching law based upon having said correction signal maximize the magnitude of said time-derivative of order $n$ progressively; a selecting member arranged to route said correction signal with its sign successively in different channels each corresponding to one of said actuators, with the commutation from one channel to another being operated at defined selection moments; and a plurality of integrating members each in one of said channels and arranged to generate the time-integral of said correction signal and apply said integrated signal to the corresponding actuator; whereby said apparatus brings said second signal representative of the time-derivative of order $n$ of the operating criterion toward maximum value and maintain this maximum in order to have the operating criterion itself dynamically brought toward a maximum value corresponding to the optimum performance of said installation and maintained at the latter maximum.

For a better understanding of the invention and to show how the same may be carried into effect, reference will now be made, by way of example, to the accompanying drawings, in which.

Figure 1:
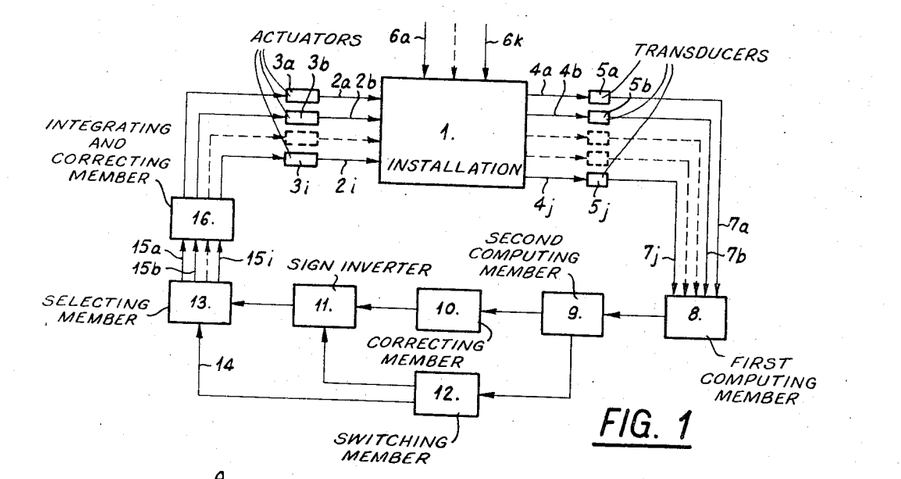
FIGURE 1 is a functional diagram.

In FIGURE 1, reference numeral 1 denotes an assumed industrial process the functioning of which is governed by a set of physical action quantities denoted $2_a$, $2_b \ldots 2_i$ which can be varied by means of actuating devices denoted $3_a$, $3_b \ldots 3_i$, and the operation of which process is characterised by a set of physical quantities denoted $4_a$, $4_b \ldots 4_j$, which can be measured, for example in the form of electric signals, with the aid of measuring device denoted $5_a$, $5_b \ldots 5_j$. This industrial process 1, is, in addition, subject to disturbances generally represented by the arrows $6_a \ldots 6_k$, generally of a random nature, which cannot be controlled. From signals $7_a$, $7_b \ldots 7_j$, generated by the measuring device 5, there is first elaborated, with the aid of a first computing member 8, an operating criterion, i.e. a mathematical function of the physical quantities 4. The nature of this operating criterion and the form of this mathematical function are specific for each application and thus will not be defined. This operating criterion is differentiated with respect to time, for example, with the aid of a second computing member 9, to an order $n$ equal to the order $k$ of the process. By "order $k$ of the process" is meant the number $k$ of the time constants by which it is affected indepenedently of the time constants peculiar to the actuating device. This order $k$ relates to a particular action quantity and may differ in accordance with the action quantity envisaged. Only the largest time constants, which will hereinafter be called the significant time constants, are taken into consideration in determining the order $k$ of the process. In practice, it is possible to neglect those which are ten times smaller than the largest. Therefore, the operating criterion will be differentiated to the order one if the process is affected, in relation to the action quantity envisaged, by only one significant time constant, to the order two if it is affected by two significant time constants, and so on. Generally speaking, $n=k$. With the aid of a third computing member 10, there is obtained from the operating criterion and from its derivatives in relation to time to the order $n$, a correction signal which represents the speed with which each of the action quantities 2 must vary. The law in accordance with which this correction is calculated is arbitrary and it need not be defined for an understanding of the following explanation.

This correction signal has an arbitrary sign, positive or negative, and, with the aid of a sign inverter 11, this sign is thereafter changed in accordance with a given switching law, which is obtained with the aid of switching member 12. The effect of this switching law is to change the sign of the correcting signal each time the derivative of order $n$ of the operating criterion passes through a maximum, this maximum being revealed by any of the known methods, for example by the direct detection method which will hereinafter be described.

One of the action quantities 2, for example $2_a$, is then modified, while the other quantities, for example $2_b \ldots 2_i$, are maintained constant, by subjecting it to a variation which is equal to the integral with respect time of the correction signal, the value and sign of which have been determined as has just been seen, this integral having been given, in addition, a correction which is intended to compensate for the time constant proper of the actuating device, for example $3_a$, corresponding to this quantity $2_a$. For this purpose, the correction signal is conducted, by a selection member 13, along that one of channels 15, for example $15_a$, which leads to the corresponding actuating device $3_a$. The integral of this correction signal is thereafter formed with the aid of a set of integrating and correcting members 16, and there is applied to this integral a correction to compensate for the time constant of the actuating device $3_a$.

The change from one action member to the next is initiated by means of signals applied to the selecting member 13 in accordance with a predetermined law of selection. For example, the change from an actuating device $3_a$ to the succeeding actuating device $3_b$ may take place after a given number of changes of sign of the correction signal. In this case, the selecting member 13 is controlled by the switching member 12 itself, as is represented by the line 14.

It is also possible, and this constitutes a variant to the law of selection, to change from one actuating device to the next at predetermined intervals of time. The selecting member 13 is controlled with the aid of periodic selecting signals generated by an appropriate member of known type, for example a clock. In this case, the direct connection between the selecting member 13 and the switching member 12 is broken and the line 14 carries the periodic signals coming from the clock (not shown in FIGURE 1).

To sum up, the method consists in cyclically and independently acting on each of the action quantities by applying thereto corrections the amplitudes of which are determined by a function of the operating criterion and of its successive derivatives with respect to time and the sign of which is processed in accordance with a switching law so chosen as to bring to a maximum the derivative of order $n$ generally being equal to the order $k$ of the process in relation to the action quantity envisaged. It is to be understood that only the significant constants are taken into consideration for determining the order $k$ of the process and that the time constants of the actuating devices which are compensated for at the level of the correction signal itself.

The described procedure makes it possible to bring the process to its optimum rate of operation more rapidly than the known methods. It also makes it possible to maintain this optimum operation more closely than is the case with heretofore known procedures. The utilisation of a switching law based on the maximum of the derivative of order $n$ of the operating criterion, instead of the maximum of the operating criterion itself, renders possible a rate of correction about ten times higher than the heretofore known procedures.

The described procedure involves successive operations of derivation with respect to time. It is known that the formation of the derivatives of a signal, in the mathematical sense of the word, is not physically practicable. It is also known that the formation of such a signal would not be desirable owing to the amplification of the parasitic signals ("noises" of the measuring instruments, for example), which would then make it impossible to observe the useful signals, that is to say, in the case under consideration, the variations of the signal representing the operating criterion of the process. In practice, therefore, the formation of these derivatives, in the mathematical sense of the term, will be achieved approximately either by obtaining the finite differences, which consists in utilising the variations of order $n$ of the operating criterion considered at finite intervals of time, it being then a question of a discontinuous method of obtaining a signal the error of which relative to the real derivative is smaller when the intervals of time chosen are shorter, or by the utilisation of a continuous method, which is well known in the analogue computation art, the error in the formed signal being less when the variations of the operating criterion are slower.

In both cases, the members capable of producing these signals are of a known type and they are able to eliminate parasitic signals. The choice of these members will depend upon the applications envisaged and more especially of the "useful signal/parasitic signal" ratio affecting the operating criterion.

In order to describe the apparatus by which this method is performed, a particular case will be considered by way of example, i.e. the case in which the industrial installation is a furnace the temperature of which is to be maintained at a maximum level for a given rate of supply of fuel, despite disturbances, notably those represented by the different masses and the varied materials of the objects to be heated, as also the variations in the calorific power of the fuel.

Figure 2:
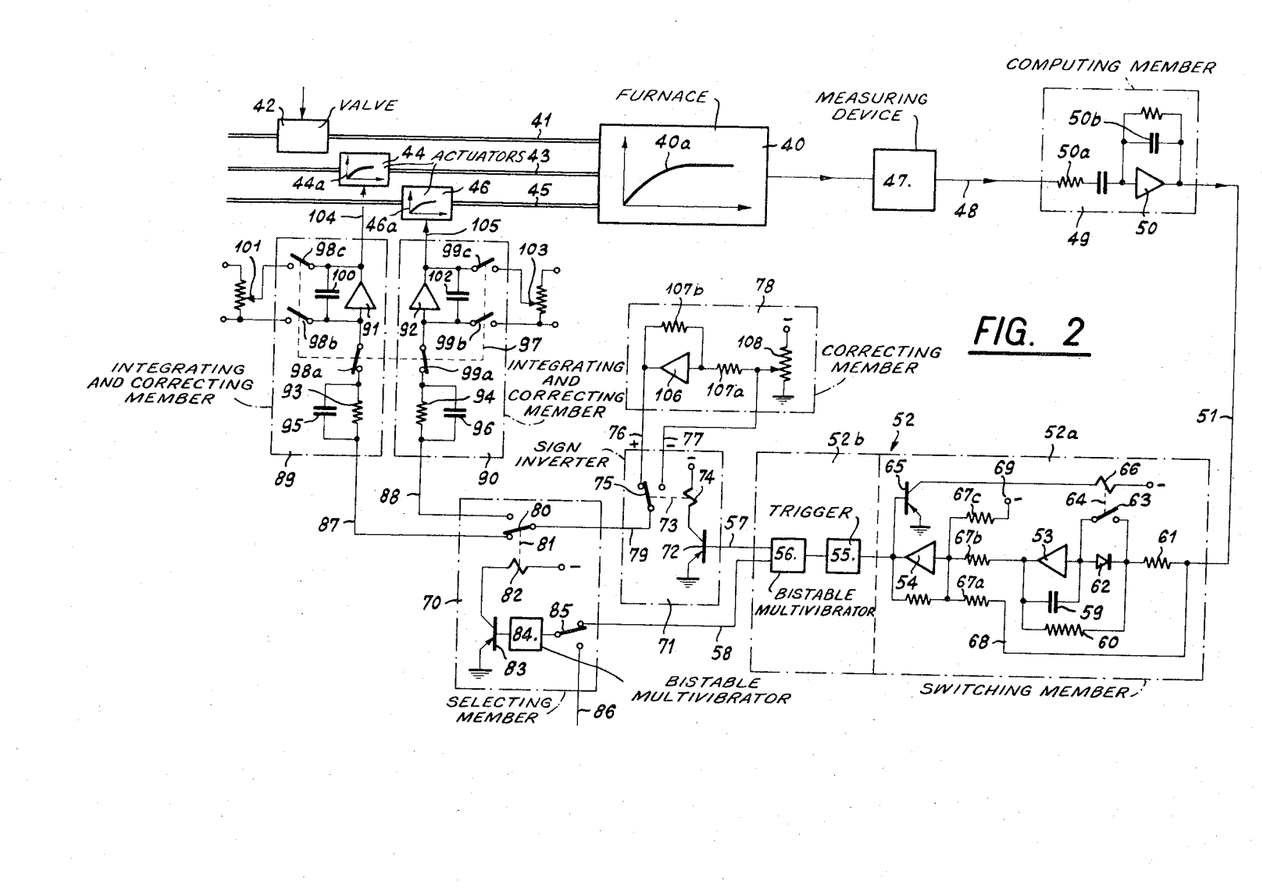
FIGURE 2 is a circuit diagram of an electrical form of an apparatus.

Referring now to FIGURE 2 there is shown a furnace 40 heated by the combustion of a fuel and a combustion-assisting agent. The furnace 40 receives an afflux of secondary air intended for ventilation and for maintaining a uniform temperature. The fuel arrives through a duct 41 and its rate of supply is adjusted by a valve 42 which is controlled from the outside and which will be assumed to be unaffected by the regulating apparatus. The combustion-assisting agent, which is composed of a mixture of air and oxygen, is fed through a duct 43 and its rate of flow is adjusted by an electro-magnetic valve 44 controlled by the regulating apparatus. A duct 45 supplies the secondary air, the rate of flow of which is adjusted by a second electromagnetic valve 46, also controlled by the regulating apparatus. This particular process, the heating of the furnace, is therefore governed by two variables, the rate of supply of combustion-assisting agent and the rate of supply of secondary air, both of which are controlled by electromagnetic valves 44 and 46. Each of the valves 44 and 46 has its own time constant resulting from inertia, these time constants being diagrammatically represented by the curves 44$a$ and 46$a$. The time constants are compensated for, as will hereinafter be seen, in the regulating apparatus itself. It is therefore unnecessary to take account of this. The furnace 40 itself has its own time constant due to its thermal inertia, as illustrated by the curve 40$a$. This time constant is not compensated for and the regulating apparatus must take account of this.

The regulating apparatus in this particular case, is arranged to regulate the electromagnetic valves 44 and 46 in such a manner that the temperature of the furnace always has the maximum value corresponding to the applied rate of supply of fuel, the valve 42 having been adjusted initially. The operating criterion is therefore reduced to the temperature $\theta$ which must be maximised by means of the regulating apparatus. A measuring device 47, for example an electric pyrometer, is arranged to measure the temperature of the furnace 40 at each instant and to translate it into an electric signal transmitted through a line 48. Owing to the fact that the operating criterion is reduced, in this particular process, to a directly measurable quantity, the first computing member 8 of FIGURE 1 is not required to form the operating criterion from a number of signals transmitted by a number of measuring members 5 (FIGURE 1). It is therefore sufficient in this example to form the derivatives of the signal which, representing the operating criterion, is set up at the output of the pyrometer 47 (FIGURE 2). This is achieved by a computing member 49 connected to the single measuring device 47 by the line 48. Since the industrial installation consisting of the furnace is affected by only one time constant, that of the furnace, the process is of the first order and the regulating apparatus must maximize the first derivative with respect to time of the operating criterion. The computing member 49 consequently includes a single differentiating circuit 50 and a filter, comprising a resistance 50$a$ and a capacitance 50$b$, the function of which is to eliminate the "noise." A line 51 connects the computing member 49 to a switching member 52 and transmits thereto a signal representing this first derivative. This switching member comprises, in sequence, two operational amplifiers 53 and 54, a trigger circuit 55 and a bistable multivibrator 56 having two outputs which are connected to the lines 57 and 58 respectively. The amplifier 3 is a storage member provided with a condenser 59, resistances 60 and 61, and a rectifier 62 adapted to be short-circuited by the contact 63 of a relay 64. The contact 63 is open when the coil 66 of the relay 64 is not energised and it is illustrated in this position in FIGURE 2. The amplifier 54 is connected as an adder by means of resistances 67$_a$ to 67$_c$ in accordance with a conventional system in the analogue computer art. The inputs of the amplifier are three in number: the first, containing the resistance 67$_a$, is connected by a line 68 to the line 51 extending from the computing member 49; the second, containing the resistance 67$_b$, is connected to the output of the amplifier 53; the third, containing the resistance 67$_c$, is connected by the terminal 69 to a source (not shown) of adjustable negative voltage of amplitude S.

The output of the amplifier-adder 54 is connected both to the base of a transistor 65 and to the trigger circuit 55. The trigger circuit 55, which is, for example, a Schmitt trigger circuit, is designed to be responsive to the sign of the signal which reaches it from the amplifier-adder 54, so as to transmit to the bistable multivibrator 56 a signal of constant amplitude which is positive if the output of the adder 54 is positive and negative if this output is negative.

The bistable multivibrator 56 is designed to change over from one of its two stable positions to the other when the signal transmitted to it by the trigger circuit 55 changes from a negative value to a positive value and to remain in this state when the signal changes from a positive value to a negative value. The multivibrator 56 has two symmetrical outputs which each generate signals symmertical with one another. One of its outputs is connected by the line 58 to a selecting member 70, and the other by the line 57 to a sign inverter 71.

The sign inverter 71 consists of a transistor 72 and a relay 73. The transistor 72, the base of which is connected to the line 57, has its emitter connected to earth, and its collector connected through the energising winding 74 of the relay 73 to a source (not shown) of negative voltage. When the base of the transistor 72 receives a positive signal, no current flows through the winding 74 and the relay 73 is not energised. When the base receives a negative signal, a current flows through the winding 74 and the relay 73 is energised. The movable contact 75 of the relay is therefore connected to one or other of lines 76 and 77 which extend from a correcting member 78 and which each transmit correction signals of equal amplitudes but of opposite signs. The sign inverter 71 therefore processes the sign of the correction signal generated by the correcting member 78 and transmits this correction signal through the line 79 to selecting member 70 with the sign applied to it by the switching member 52.

The selecting member 70 has two inputs, one connected to the line 58 extending from the switching member 52 and the other to the line 79 extending from the correcting member 78 and sign inverter 71. The latter input leads to the movable contact 80 of a selector the fixed contacts of which are equal in number to the number of action quantities. In the particular case of the furnace there are two action quantities, and therefore two fixed contacts, the selector being a relay 81. The relay 81 comprises a winding 82 connected to a negative voltage source (not shown) and to the collector of a transistor 83 the emitter of which is earthed. The base of the transistor 83 receives a signal emanating from a bistable multivibrator 84. The multivibrator 84 is, in principle, identical to the multivibrator 56, but only one of its two outputs is employed. This multivibrator 84 changes over, as does the multivibrator 56, each time a signal applied to its input changes from a negative value to a positive value and remains in its state when the signal changes from a positive value to a negative value. This signal reaches it through a switch 85, either from the line 58 or from an external source (not shown) the purpose of which will hereinafter become apparent and which is connected to a line 86.

The selecting member 70 therefore has the effect of directing the signals emanating from the correcting member 78 to either one of the lines 87 and 88 by which it is connected to integrating and correcting members 89 and 90 equal in number to the number of actuating devices. Routing along one channel or the other depends upon which of the actuating devices, in the present instance the electromagnetic valves 44 and 46, is to be controlled by the signals, while the selection of one channel or the other depends upon the selecting member 70.

The integrating and correcting members 89 and 90 are arranged to integrate with respect to time the signals which reach them and to compensate for the time constant of the actuating devices which each of them controls, and are known devices of like construction for each of the channels. In our example, they consist of operational amplifiers 91, 92, the input resistances 93 and 94 of which are shunted by capacitances 95, 96 for compensating for the time constant $44_a$ of the electromagnetic valve 44 and the time constant $46_a$ of the electromagnetic valve 46, respectively. A common switch 97 having multiple contacts $98_a$, $98_b$, $98_c$, and $99_a$, $99_b$, $99_c$, respectively makes it possible, by means of its contacts $98_a$ and $99_a$ respectively, to place the optimum control apparatus out of action by opening the connection between the resistances 93 and 94 and the input of the amplifiers 91 and 92 respectively. The switch 97 is designed in such a manner that all its contacts will be simultaneously actuated, the contacts $98_b$, $98_c$, $99_b$ and $99_c$ being closed at the instant when the contacts $98_a$ and $99_a$ are opened, and vice versa. The contacts $98_b$ and $98_c$ make it possible to apply to the terminals of the capacitance 100 of the operational amplifier 91 an external voltage which may be varied by any known means, for example a potentiometer 101. Likewise, the contacts $99_b$ and $99_c$ make it possible to apply to the terminals of the capacitance 102 of the operational amplifier 92 an external voltage which may be varied, for example, by means of a potentiometer 103. The common switch 97 is intended for changing from automatically controlled operation of the furnace (contacts $98_a$, $99_a$ closed, contacts $98_b$, $98_c$, $99_b$, $99_c$ open) to manually controlled operation (contacts $98_a$, $99_a$ open, contacts $98_b$, $98_c$, $99_b$, $99_c$, closed), this manual control being effected by manipulation of the potentiometers 101 and 103 respectively.

Lines 104 and 105 transmit to the electromagnetic valves 44 and 46 respectively the control signals emanating respectively from the integrating and correcting members 89 and 90.

The switch 85 of the selecting member 70 enables the law of selection to be changed at will. When this switch is in the position illustrated in FIGURE 2, in which it places the line 58 in circuit, the actuating devices which receives the correction signals carried along the line 79 cyclically changes in accordance with an internal law of selection. In the described example, this internal law of selection consists in changing from one actuating device to the other each time that the relay 73 of the sign inverter 71 has performed two reverses of the sign of the correction signal. When the switch 85 is in the other position, the signals carried along the line 58 have no effect. These are then external signals introduced through the line 86, which control the selecting member 70. The change from one actuating device to the other takes place in this case in accordance with an external law of selection which is arbitrary and which may, for example, consist in effecting the change at constant intervals of time. The signals applied to the line 86, which are generated by a device not shown, then succeed one another periodically.

For reasons which will hereinafter be given, the law of correction utilised is a constant law, that it to say, the correction signal always retains the same value, only its sign changing when the first derivative of the operating criterion passes through a maximum. This is why the correcting member 78 is simplified to the extreme and has ultimately merely the object of generating two constant voltages of opposite signs and of applying them to the lines 76 and 77 respectively. This is effected, for example, by means of an amplifier-phase shifter 106 combined with two equal resistances $107_a$ and $107_b$ and having its input connected to a constant negative voltage source (not shown). A potentiometer 108 is provided to adjust the two voltages, positive and negative, set up along the lines 76 and 77 respectively.

The operation of the apparatus is as follows.

The fuel supply rate having been adjusted to a given value with the aid of the valve 42, it will be assumed that at an initial instant the supply rates of combustion-assisting agent and of secondary air respectively are adjusted by the valves 44 and 46 respectively to a value such that the temperature of the furnace has a value $\theta_0$ represented by the point $A_0$ of FIGURE 3. This temperature is below the temperature $\theta_m$ corresponding to the maximum $A_m$ of the curve 130 which represents, at a given instant, and for a given value of the secondary air supply rate, the change of the temperature as a function of the ratio of the combustion-assisting agent supply rate to the fuel supply rate. This maximum corresponds to the optimum operation of the furnace of this instant and for the particular value of secondary air supply rate.

For another value of the secondary air supply rate, the change of the temperature of the furnace as a function of the ratio of the "combustion-assisting agent supply rate to fuel supply rate" may be represented by a curve such as 131, of which the maximum $A_m'$ may be above the maximum $A_m$ of the curve 130. A set of curves such as 130, 131 therefore determines at a given instant and for a given fuel supply rate, all the values of the temperature of the furnace which it is possible to reach by varying the supply rates of the combustion-assisting agent and of secondary air. The highest value of this temperature, as defined by the point $A_m'$, corresponds to the optimum adjustment of these supply rates.

However, this set of curves, such as 130, 131, moves as a function of time under the influence of various disturbances such as, for example, the variation of the calorific power of the fuel, the oxygen content of the combustion-assisting agent, and the charge of the furnace. More especially, it may happen that after a time T these curves are changed to curves $130_a$, $131_a$, and that the optimum rate of operation of the furnace is then defined by the point $B_m'$ corresponding to a new adjustment of the supply rates of combustion-assisting agent and secondary air.

The function of the regulating apparatus is therefore to control automatically the electromagnetic valves 44 and 46 adjusting the rates of supply of combustion air and of secondary air respectively so as to produce at each instant the optimum operating conditions defined by a set of operating points such as $A_m'$ and $B_m'$.

It will be assumed that at the initial instant the point of operation is represented by the point $A_o$ of the curve 130. Let it be supposed, for the explanation of the operation of the apparatus, that the curve 130 may be regarded as constant during each of the periods in which the apparatus acts on only one and the same action quantity. It will further be supposed that at the initial instant the apparatus commences to adjust the supply rate of the combustion-assisting agent by adjusting the electromagnetic valve 44, while the electromagnetic valve 46 which adjusts the secondary air supply rate is maintained in its initial position. This means that the movable contact 80 of the relay 81 of the selecting member 70 is assumed to be in its position illustrated in FIGURE 2 at the initial instant and that it connects the line 79 to the line 87 acting on the integrating and correcting member 89 corresponding to the electromagnetic valve 44. Since the relay 81 is not energised, its winding 82 is not fed. That is to say, at the initial instant the output of the multivibrator 84 is assumed to be positive. It will further be assumed that at the initial instant the bistable multivibrator 56 is in the state in which the line 58 is rendered positive and the line 57 negative, so that the coil 74 of the relay 73 is energised and its movable contact 75 is in the position illustrated in FIGURE 2, and the line 79 is therefore connected to the line 76 carrying the positive correcting signals.

Under these conditions, the operation of the furnace represented by the point $A_o$ (FIGURE 3) is modified as a result of the change in the opening of the electromagnetic valve 44 under the effect of the positive correction signal applied thereto. It will be assumed that this change corresponds to a drift of the representative point in the direction of an increase of the temperature $\theta$. The pyrometer 47 detects this increase and the calculating computing member 49 thus sends along the line 51 a negative signal representing the derivative, of changed sign, of the operating criterion, in the present instance the temperature. This negative signal charges the condenser 59 of the switching member 52 through the resistance 61 and the rectifier 62. The amplifier 53 reproduces this signal whilst changing its sign, and it therefore applies to the input 67b of the adder 54 a positive signal symmetrical with the negative signal which is applied to the input 67a by the line 68. These two signals balance one another out and the adder delivers a constant positive signal of equal amplitude to the constant potential of the source S. The transistor 65 is therefore blocked and the coil 66 of the relay 64 is not energised, the contact 63 being open. The trigger circuit 55 applies a positive signal to the bistable multivibrator 56, which is assumed to be in such a state that the line 57 is negative and the line 58 positive.

When the derivative of the temperature $\theta$ of the furnace passes through its maximum value, the computing member 49 produces a signal which decreases. The line 51 thus carries a less negative signal and the rectifier 62 becomes blocked, which prevents the condenser 59 from discharging. The signal applied to the resistance 67b therefore remains positive and equal to its maximum value, while that applied to the resistance 67a, which is negative, decreases in absolute value. There is therefore no further compensation between the two and the signal resulting from the addition of these signals to the negative signal S decreases and is finally cancelled out and becomes slightly negative. At this instant, the transistor 65 conducts, the coil 66 of the relay 64 is energised and the contact 63 is closed, the result of which is that the rectifier 62 is short-circuited to discharge capacitor 59 through resistance 60. The potential applied to the resistance 67b again becomes equal and of opposite sign to the potential applied through the line 68 to the resistance 67a and the output of the amplifier 54 again becomes positive. The transistor is blocked, the relay 64 is de-energised, the contact 63 opens and the cycle recommences. The trigger circuit 55 therefore supplies a negative pulse at the instant when the output of the adder 54 is cancelled out. The bistable multivibrator 56, which is responsive only to the transition of its input in the direction from negative to positive, changes over at the occurrence of the second flank of the pulse, and produces a change of polarity on the lines 57 and 58. The change of polarity on the line 57, which was initially assumed to be negative, has the effect of rendering the transistor 72 non-conductive and of de-energising the relay 73, the movable contact of which moves into its second position. The line 79 is therefore connected to the line 77 carrying the negative correcting signal. In other words, the brief negative pulse delivered by the trigger circuit 55 has reversed the sign of the correction signals.

By an appropriate choice of the voltage S, it is possible to cause this brief pulse to coincide with the instant when the value of the signal carried by the line 51 commences to decrease in absolute value. In other words, the switching member reverses the sign of the correction signal each time that the first derivative of the temperature passes through a maximum (natural switching), and a succession of reversals of this sign as long as this derivative is decreasing (forced switching).

The change of polarity of the line 58 causes the bistable multivibrator 84 of the selecting member 70 to change over only when it takes place in the direction from negative to positive. Therefore, this multivibrator 84 changes over after two reverses of sign of the correction signal. We have assumed that the initial state of this multivibrator was such that the transistor 83 was non-conductive, so that the position of the movable contact 80 of the relay 81 as illustrated in FIGURE 2 corresponds to the inoperative position. The change-over of the multivibrator 84 therefore energises the relay 81 and causes the line 79 to be connected to the line 88 corresponding to the control of the electromagnetic valve 46 acting on the second action quantity, i.e. the secondary air supply rate. From this instant, the apparatus will regulate this second action quantity in accordance with a mode of action identical to that which has just been described with reference to the first. The same process of regulation will be cyclically repeated on each of the two action quantities until the absolute maximum $B_m'$ of the temperature $\theta$ of the furnace is reached.

The law of selection which is utilised by the apparatus consists in changing from one action quantity to another after two reverses of sign of the correction signal. It would be easy to apply any other selection law by replacing the bistable multivibrator 84 by other known circuits, for example by a scaler having a scaling ratio higher than two. Likewise, it would be possible to change from one action quantity to the other at given intervals of time by means of a clock connected to the line 86.

In the described example, there has been considered a system of first order. It is clear that in a system of order $k > 1$ the member 49 would comprise $n$ differentiating circuits similar to the circuit 50 and connected in cascade, so as to elaborate the derivative of order $n$ (generally $n = k$) of the operating criterion. The line 51 would then be connected to the last of these differentiating circuits, so that the switching member detects the passage through a maximum of the derivative of order $n$ of the operating criterion.

In one variant of the described method, the maxima of the derivatives of order $n$ are determined indirectly, for example by detecting the passages through zero of the derivative of order $n$. The switching law in this case consists in reversing the sign of the correction signal each time that the derivative of order $n+1$ remains negative, by forced switching, that is to say, at instants succeeding one another at a predetermined frequency $f_o$.

Figure 4:
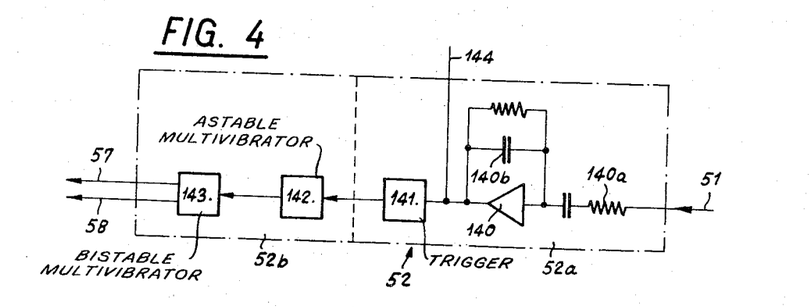
FIGURE 4 and FIGURE 6 illustrate variants of parts of FIGURE 2.

An illustrative form of the apparatus for carrying out the latter practice is illustrated in FIGURE 4. This form consists in modifying the switching member 52. In the case of the regulation of the furnace (process of the first order), the apparatus must form the derivative of order two of the temperature (operating criterion), so that the switching member comprises an input stage formed of a differentiating circuit 140, based on a similar principle to the circuit 50 of FIGURE 2 and completed by a resistance 140a and a capacitance 140b which are intended for filtering the "noise." The differentiating circuit 140 acts on a trigger circuit 141, for example a Schmitt trigger circuit, which is identical to the trigger circuit 55 of FIGURE 2 but is completed by an internal bias (not shown), such that when the second derivative produced by the differentiating circuit 140 is zero this trigger circuit nevertheless delivers a negative signal. The signal emanating from the trigger circuit 141 is applied to the input of an astable multivibrator 142 so designed as to produce a signal which is negative and of constant amplitude, if it receives a positive signal, and which consists of a series of alternately positive and negative pulses of constant amplitude if it receives a negative signal. An internal network (now shown) comprising resistances and capacitances imparts to the frequency $2f_o$ of these pulses a fixed but adjustable value, which will hereinafter be defined. The astable multivibrator 142 acts in turn on a bistable multivibrator 143 which is identical to the bistable multivibrator 56 of FIGURE 2 and which is, like the latter, responsive only to changes of polarity at its input in the direction from negative to positive. The remainder of the apparatus is unchanged and the lines 57 and 58 transmit to the switch circuit 71 and to the selecting member 70 respectively the signals emitted by the said bistable multivibrator 143.

The operation of the switching member thus modified is as follows. The line 51 transmits a signal which is proportional to the first derivative, of changed sign, of the temperature. There is therefore set up at the input of the trigger circuit 141 a signal proportional to the second derivative of the temperature and having the same sign as this second derivative. When the second derivative is positive, the input of the astable multivibrator 142 is positive and the latter is in a state such that it delivers a negative signal. It will be assumed that at the initial instant the line 57 is negative and the line 58 positive, as in the case of FIGURE 2. When the first derivative commences to decrease after having passed through a maximum, the second derivative is cancelled out and becomes negative. The trigger circuit 141 changes its state and applies to the astable multivibrator 142 a negative signal, causing change over of the bistable multivibrator 143 (natural switching). As long as the second derivative remains negative, the input of multivibrator 142 is negative. The bistable multivibrator 143 changes over at each negative-to-positive flank of the resulting oscillations, so that the sign inverter 71 periodically reverses the sign of the correction (forced switching). When the second derivative again becomes positive, which is an indication that the first derivative is commencing to increase again and is tending towards a maximum, the trigger 141 again changes state and again applies a positive signal to the input of the astable multivibrator 142. The latter ceases to oscillate and the sign of the correction signal is not reversed again but remains in its state occurring after the last change of sign, and this is as long as the second derivative does not pass through zero from a positive value towards a negative one (natural switching).

The astable multivibrator 142 is so designed that when its input is negative it delivers a series of alternately positive and negative pulses at a predetermined frequency $2f_o$. This arrangement has the object of applying a forced switching of the sign of the correction signal as long as the second derivative remains negative. This may happen in the presence of disturbances tending to remove the operating point from its optimum value and this arrangement then ensures in all cases a return to optimum regulating conditions. For example, it permits of changing from the operating point $A_m'$ to the operating point $B_m'$ (FIGURE 3) in the event of the curves 130, 131 being modified, under the action of disturbances, so as to become curves $130_a$, $131_a$. In other words, this arrangement ensures stability of operation of the assembly comprising the furnace and the regulating apparatus.

The forced switching frequency must be adjusted in each particular case to a value which is sufficiently low for the consequence of a reverse in the sign of the correction signal to have time to modify the signal elaborated by the differentiating circuit 140, and to a value sufficiently high for rapidly correcting the influence of the disturbances.

The example which has been described concerns an installation of the first order, that is to say, one having a single significant time constant, in the present instance the thermal inertia of the furnace. The switching law applied to the sign of the correction signal is based upon the passage through zero, in the direction from positive to negative, of the time-derivative of order two of the operating criterion, in the present instance the temperature of the furnace, completed by a forced switching at a predetermined frequency $f_o$, as long as the said second derivative remains negative.

In the case of a more complex installation, of an order $k > 1$, and thus having a number of significant time constants, the switchcing law would be the same, but based on the passage through zero, in the direction from positive to negative, of the derivative of order $n+1$.

When the indirect detection of the maximum of the derivative of order $n$ is utilised, it is advantageous to apply a correction signal which is variable instead of remaining constant. Moreover, there is complete freedom for rendering the correction signal dependent upon the value of the operating criterion, and of its derivatives of order lower than or equal to $n+1$, in accordance with any desired mathematical law. It is sufficient for the correcting member to be so designed as to elaborate, by any known means, a signal conforming to this mathematical law.

Figure 5:
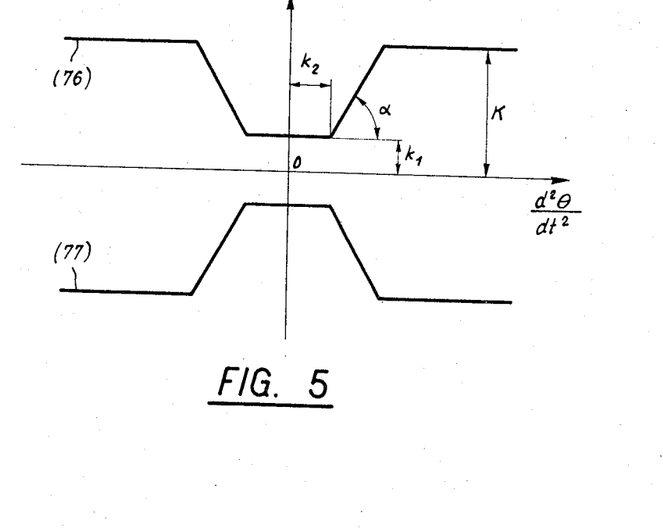
Figure 6:
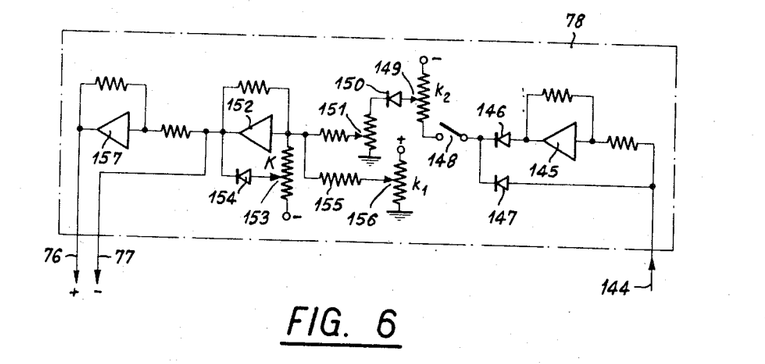

If, for example, it is desired that the correction signal shall have the curve form shown in FIGURE 5, in which the amplitude of the correction signal has been plotted along the ordinates and the value of the second derivative of the temperature along the abscissae, the correcting member 78 may be as shown in FIGURE 6. A line 144 transmits the signal representing the second derivative to a phase-shifting amplifier 145 provided with rectifiers 146 and 147, which produces a signal representing the absolute value of this second derivative. A switch 148, the function of which will hereinafter be explained, transmits the said signal, when closed, to an adding and limiting stage 152, through a potentiometer 149 connected to the negative pole of a voltage source (not shown), a rectifier 150 and a potentiometer 151 connected to earth. The said adding and limiting member comprises a variable voltage source, for example a potentiometer 153 connected to the negative pole of a source (not shown), and a rectifier 154. In addition, it receives through a resistance 155 an additional positive signal whose amplitude may be adjusted, for example by means of a potentiometer 156 connected to the positive pole of a voltage source (not shown). The additional signal is therefore superimposed upon that which emanates from the switch 148, which commences to act on the adder 152 only when its value is higher than the voltage supplied by the potentiometer 149, so that there is obtained at the output of the adder 152 a signal which has the curve form shown in FIGURE 5. This signal is applied without further modification to the line 77, and it is applied to the line 76 after a phase-shifting amplifier 157 has changed its sign. There are therefore present along each of these lines 77 and 76 two correction signals which are identical in absolute value but of opposite signs. As will be seen, the stage 145 elaborates the absolute value of the second derivative, the potentiometer 156 adds thereto a voltage $k_1$, and the stage 152 elaborates a signal proportional to this absolute value when the latter is higher than the voltage $k_2$ adjustable by means of the potentiometer 149, and limits the signal to a maximum value K which is adjustable with the aid of the potentiometer 153. The coefficient of proportionality between the absolute value of the second derivative and the output of the adder 152 is adjustable by means of the potentiometer 151.

The switch 148, when open, withholds the influences of the second derivative of the temperature from the adder, and the correction signal then has a constant amplitude $k_1$ lower than or equal to K. The switch thus enables the apparatus to act either in accordance with a law of action conforming to FIGURE 5 or in accordance with a constant law of action as required.

It will be obvious, and this is provided for by the invention, that any other law of action may be utilised. If this law involves the derivative of order one, it is necessary to connect the correcting member 78 to the line 51 by means of an additional line.

To sum up, the apparatus regulates the furnace by modifying successively the rate of flow of combustion-assisting agent and the rate of flow of secondary air, these modifications being determined by a correcting signal the sign of which is reversed when the first derivative of the temperature passes through a maximum. The maximum of the first derivative is detected either directly or indirectly, for example by the passages through zero of the second derivative. In the latter case, the sign of the correction signal is in addition reversed by forced switching as long as the second derivative remains negative. The correction signal may depend upon the temperature and upon its derivatives, up to and including the order two, in accordance with any law. Finally, the cycle in accordance with which the change-over from the action on the supply rate of combustion-assisting agent to the action on the supply rate of secondary air is effected is defined either by a given number of reverses in the sign of the correction signal or by a predetermined period of action on each of these two action quantities. This mode of regulation enables the furnace to reach its optimum rate of operation more rapidly and to remain more closely to this rate of operation than the known methods, owing to the fact that it is not limited in its rapidity of action by the time constant of the furnace.

What is claimed is:

1. Apparatus for controlling an industrial installation having at least one significant time constant, the performance of said installation depending on action quantities capable of being varied independently one after the other by corresponding actuators and the performance of said installation being defined by a first signal representing the instantaneous value of an operating criterion and which first signal is a function of at least one physical quantity continuously measured in said installation by a corresponding one of at least one transducer, said apparatus having to bring and maintain dynamically said installation to optimum performance, defined by said operating criterion reaching a maximum value, and said apparatus comprising:

(a) a computing member connected with said at least one transducer and fed said first signal and arranged to generate a second signal representative of the instantaneous value of the time-derivative of order $n$ of said first signal where $n$ is equal to the number of said significant time constants;

(b) a correcting member for generating a correction signal representative of the rate of variation of said action quantity;

(c) a switching member arranged for reversing the sign of said correction signal at switching instants defined by a switching law based upon having said correction signal maximize the magnitude of said time-derivative of order $n$ progressively;

(d) a selecting member arranged to route said correction signal with its sign successively in different channels each corresponding to one of said actuators, with the commutation from one channel to another being operated at defined selection moments; and (e) a plurality of integrating members each in one of said channels and arranged to generate the time-integral of said correction signal and apply said integrated signal to the corresponding actuator; whereby said apparatus brings said second signal representative of the time-derivative of order $n$ of the operating criterion toward maximum value and maintains this maximum in order to have the operating criterion itself dynamically brought toward a maximum value corresponding to the optimum performance of said installation and maintained at the latter maximum.

2. An apparatus as in claim 1 wherein said switching member comprises a circuit arranged to store the instantaneous value of said second signal representative of the time-derivative of order $n$ as soon as said signal begins to decrease, generate a switching pulse to reverse the sign of said correction signal at the instant when the value of said second signal drops by more than a given extent below the stored value thereof, and store the new instantaneous value of said second signal when said switching pulse has been generated, the instant of the pulse generation being one of said defined switching instants.

3. An apparatus as in claim 1 wherein said switching member comprises a circuit arranged to differentiate with respect to time said second signal and generate a third signal representing the time-derivative of order $n+1$ of said operating criterion, produce a switching pulse to reverse the sign of said correction signal at the instant when said third signal passes through zero from a positive value to a negative value, and generate periodic switching pulses at a given frequency while said third signal remains negative.

4. An apparatus as in claim 1 wherein said selecting member comprises a selector for connecting the output of said switching member with one of said channels at a time and a circuit to operate the commutation from one of said channels to another as soon as a given number of said switching pulses have been generated, so that said selection moments are defined by the number of sign reversals of said correction signal.

5. An apparatus as in claim 1 wherein said correcting member comprises a phase-shifter and two rectifiers arranged to generate a third signal which is proportional to the absolute value of the time-derivative of order $n+1$ of said first signal, said third signal constituting said correction signal.

6. An apparatus as in claim 5 wherein said correcting member further comprises an adding and limiting stage for imposing an upper limit to the value of said third signal, and for adding to said third signal a constant value, the combined adding and limiting action of said stage giving to said correction signal a value lying between an upper and a lower limit.

7. Apparatus for controlling an industrial installation having at least one significant time constant, the performance of said installation depending on action quantities capable of being varied independently one after the other by corresponding actuators and the performance of said installation being defined by a first signal representing the instantaneous value of an operating criterion and which first signal is a function of at least one physical quantity continuously measured in said installation by a corresponding one of at least one transducer, said apparatus having to bring and maintain dynamically said installation to optimum performance, defined by said operating criterion reaching a maximum value, and said apparatus comprising:

(a) a computing member connected with said at least one transducer and fed said first signal and arranged to generate a second signal representative of the instantaneous value of the time-derivative of order $n$ of said first signal where $n$ is equal to the number of said significant time constants;

(b) a correcting member for generating a correction signal representative of the rate of variation of said action quantity;

(c) a switching member arranged for reversing the sign of said correction signal at switching instants defined by a switching law based upon having said correction signal maximize the magnitude of said time-derivative of order $n$ progressively;

(d) a selecting member arranged to route said correction signal with its sign successively in different channels each corresponding to one of said actuators, with the commutation from one channel to another being operated at defined selection moments; and (e) a plurality of integrating and correcting members each in one of said channels and arranged to generate the time-integral of said correcting signal and apply to said integrated signal a correction for compensating the individual time constant of the corresponding actuator; whereby said apparatus brings said second signal representative of the time-derivative of order $n$ of the operating criterion toward maximum value and maintains this maximum in order to have the operating criterion itself dynamically brought toward a maximum value corresponding to the optimum performance of said installation and maintained at the latter maximum.

References Cited

UNITED STATES PATENTS

| | | | |
|---|---|---|---|
| 2,628,606 | 2/1953 | Draper et al. | 235—150.1 |
| 2,995,301 | 8/1961 | Seliger et al. | 235—150.1 |
| 3,070,301 | 12/1962 | Sarnoff | 235—150.1 |

OTHER REFERENCES

"Optimizing Control of a Chemical Process," Eckman and Lefkowitz, Control Engineering, September 1957 (pp. 197–204).

"Optimalizing System for Process Control" (a series of three articles by Y. T. Li), Instruments, vol. 25, January 1952 (pages 72–77); February 1952 (pages 190–193, and 228); March 1952 (pages 324–327, 350 and 352).

MALCOLM A. MORRISON, *Primary Examiner.*

MARTIN P. HARTMAN, *Examiner.*

A. J. SARLI, *Assistant Examiner.*